June 2, 1925.　　　　　　　　　　　　　　　　　　　1,540,458
E. R. BURTNETT
INTERNAL COMBUSTION ENGINE
Filed Aug. 2, 1923
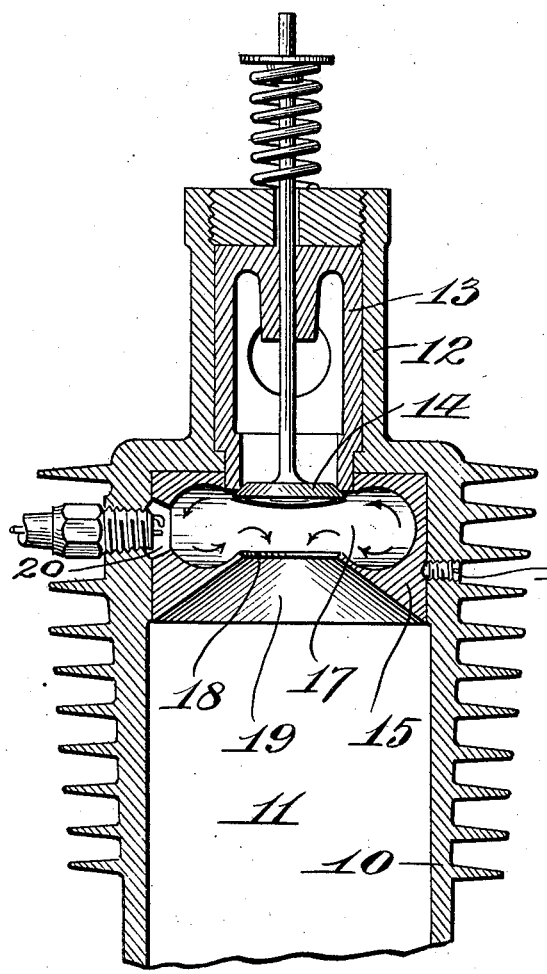
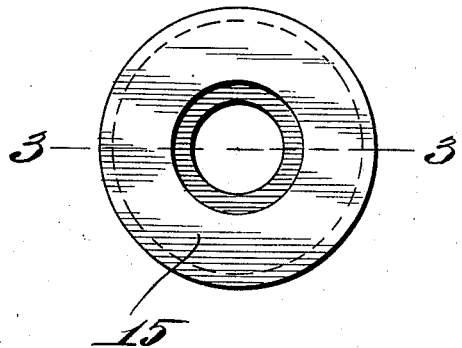
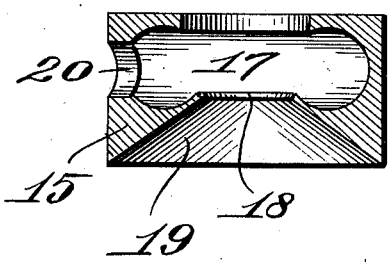
Inventor,
Everett R. Burtnett.
By Martin P. Smith, atty.

Patented June 2, 1925.

1,540,458

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed August 2, 1923. Serial No. 655,268.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates generally to internal combustion engines and more particularly to a block or member that is adapted to be removably positioned in the head portion of the chamber within the combustion cylinder of an engine and said block being formed with an annular chamber or space that functions as a combined gaseous fuel charge stratification and ignition chamber.

Those familiar with the art of internal combustion chamber engine design and particularly the form of the combustion chambers, know that the shape of the combustion chamber and the position of the inlet port in relation to the shape of the combustion chamber, have much to do with the course of the fresh charge entering the cylinder, either to develop a great turbulence with the cylinder, or to effect a directly opposite result. Designers of conventional four cycle engines endeavor to construct the combustion chambers, so as to provide as great a turbulence of the charge as possible, and, since the residual content of the combustion cylinder compression clearance dilutes the incoming fresh gaseous charge, it is desirable to mix as thoroughly as possible the two charge volumes, for the reasons that turbulence of the charge tends to scour the cylinder walls, of the fuel products of condensation—and to retard detonation by spacing the globules of gas between the inert products of combustion, thereby speeding up combustion by the mechanical action of the charge during flame propagation.

In four stroke cycle internal combustion engines where a super charge is desired and an added percentage of inert volume is used to gain expansion, it is desirable to stratify the gaseous fuel charge, and keep the inert volume and the gaseous volume in localized form, because where a greater ratio of inert volume is used and a given fuel mixture density is desired, the charge would become too lean for efficient combustion.

In two stroke cycle internal combustion engines of the constant compression charge induction scavenging type, where the full cylinder displacement quantity of residual products are retained in the cylinder at mean atmospheric pressure, to the ratio of fuel charge induction, the inert volume percentage is extremely high at light throttle and light load engine operation conditions. Hence in this type of engine, it is necessary for efficient operation, to keep the inert and gaseous fuel charges separate in localized form.

The principal objects of my invention are to provide means of accomplishing charge stratification, to provide an improved localized chamber, which can be removed and replaced, or cleaned, to provide an ignition chamber, in which, by its particular construction, a gaseous mixture can be inducted into the cylinder and maintained in its initial density, to the point of ignition when a variable quantity volume is inducted, providing thereby, normal rhythmic engine operation and efficiency combustion with a proportionately great inert volume.

Fig. 1 is a vertical section taken through the upper portion of the combustion cylinder of an internal combustion engine having a gaseous fuel stratification chamber of my improved construction.

Fig. 2 is a top plan view of the block that is adapted to be inserted in the combustion cylinder of an engine and which block has formed therein the stratification chamber contemplated by my invention.

Fig. 3 is a cross section taken on the line 3—3 of Fig. 2.

Referring by numerals to the accompanying drawings, 10 designates the combustion cylinder of an internal combustion engine, 11 the piston sweep chamber therein, 12 a valve cage housing that extends upwardly from the head of the cylinder 13, the gaseous fuel inlet valve cage that occupies said housing 12, and 14, a spring held inwardly opening gaseous fuel inlet control valve that normally rests on a seat at the lower end of cage 14.

My invention contemplates a relatively short cylindrical block 15 that fits snugly within the upper end of chamber, directly against the underside of the cylinder head and said block being firmly secured in such position in any suitable manner, preferably by one or more set screws such as 16, that are seated in the cylinder wall and bear against the peripheral surface of said block.

Formed in the top of the block 15 is a circular opening that receives the relatively short lower end portion of cage 13 that projects into the combustion cylinder and upon which the fuel inlet valve seat is formed.

Formed within the block 15 is a horizontally disposed ring-shaped or annular chamber 17 that is substantially round in cross section. This chamber 17, which serves as the gaseous fuel charge stratification and ignition chamber is concentric with the axes of the inlet valve 14 and the piston sweep chamber 11, and the bottom of said stratification chamber communicates by means of a centrally arranged opening 18 with the upper end of a relatively low or flat conical throat 19, that is formed in the lower portion of block 15 and which flares outwardly toward its lower end at the lower outer edge of said block 15. Thus the diameter of the lower end of throat 19 is practically the same as the diameter of piston sweep chamber 11, and as the opening 18 at the upper end of the throat is centrally arranged and of relatively small diameter, the main portion or the annular space within the stratification chamber 17 surrounds and lies concentric with the opening 18, and with inlet valve 14, that occupies a position directly above said opening 18.

Formed in the side of block 15 and communicating with chamber 17 is an aperture 20 that is for the accommodation of the terminals of the electrodes of a spark plug 21, the latter being seated in the wall of cylinder 10. Obviously there may be two or more of these spark plug openings.

On the outward or induction stroke of the piston in chamber 11, valve 14 is opened and a charge of gaseous fuel flows downwardly over the bevelled edge of the open valve and said gaseous fuel then flows outwardly and downwardly and thence inwardly and upwardly through the annular chamber 17 (as shown by arrows Fig. 1).

Finally this fuel charge passes downwardly through the center of opening 18 and through the tapered throat into chamber 11 and the lower portion of the latter, or that portion directly above the head of the piston, being filled with an inert charge volume that may be admitted in any well known and conventional manner.

On the upward or inward stroke of the piston, the charge of gaseous fuel that was admitted as just described, will, in practically undiluted condition, be compressed in the annular chamber 37 and upper portion of throat 11, and the inert charge volume below the volume of gaseous fuel will be compressed in a stratum between the stratum of compressed gaseous fuel and the head of the piston.

At the point of highest compression, a spark produced between the ends of the electrodes of the sparg plug, ignites the charge of gaseous fuel compressed within chamber 17 and the force of the expansion following combustion will pass downwardly through throat 19 and act through the compressed inert volume directly against the head of the piston to drive same outward on its power stroke.

The relatively short tapered throat 19, permits the expansion following combustion to act without restriction upon the head of the piston within the upper end of chamber 11, and as said throat tapers outwardly to the full diameter of the piston sweep chamber, all of the expansive forces will pass directly to the piston head.

The block containing the stratification and ignition chamber is formed in a single piece, may be easily and cheaply produced, is readily removable so as to facilitate cleaning, and is very effective in performing its intended functions.

It will be apparent that my improved device as herein shown and described may be changed slightly in certain details of construction without departing from the spirit of my invention, the scope of which is set forth in the appended claims.

I claim as my invention:

1. A member adapted to be positioned in the head portion of an internal combustion engine cylinder, said member being provided with a chamber that is adapted to communicate with the gaseous fuel inlet port in said cylinder, and said chamber being formed so as to cause the admitted gaseous fuel to flow outwardly and downwardly and thence inwardly and upwardly through said chamber before discharging therefrom.

2. A member adapted to be positioned in the head portion of an internal combustion engine cylinder, said member being provided with a chamber that is adapted to communicate with the gaseous fuel inlet port in said cylinder, said chamber being formed so as to cause the admitted gaseous fuel to flow outwardly and downwardly and thence inwardly and upwardly through said chamber before discharging therefrom, and there being a tapered throat leading downwardly through the member from the central portion of the chamber therein.

3. A member adapted to be positioned in the head portion of an internal combustion engine cylinder, said member being provided with a chamber that is adapted to communicate with the gaseous fuel inlet port in said cylinder, said chamber being formed so as to cause the admitted gaseous fuel to flow outwardly and downwardly and thence inwardly and upwardly through said chamber before discharging therefrom, there being a tapered throat leading downwardly through the member from the central portion of the chamber therein, and the lower end of which throat is substantially the same in diameter as the diameter of the chamber in the engine cylinder.

4. A charge stratification and ignition chamber piece for internal combustion engine comprising a substantially cylindrical block that is adapted to be positioned in the upper portion of an engine cylinder, there being a concentric, annular, ring-shaped chamber, formed in said block, there being centrally located openings formed in the upper and lower portions of said block and communicating respectively with the top and bottom of said ring-shaped chamber, and the opening in the lower portion of said block being substantially conical in shape with the diameter at its lower end, substantially equal to the diameter of the engine chamber in which the piece is located.

5. A charge stratification and ignition chamber piece for internal combustion engines comprising a substantially cylindrical block that is adapted to be positioned in the upper portion of an engine cylinder, there being a centrally arranged gaseous fuel inlet opening in the top of said block, there being a centrally arranged opening in the lower portion of said block, there being formed within said block, between said openings and communicating therewith, an annular chamber that is substantially round in cross-section, and there being an ignition device opening formed in the side of said block and communicating with said annular chamber.

In testimony whereof I affix my signature.

EVERETT R. BURTNETT.